(12) United States Patent
Pandharipande et al.

(10) Patent No.: US 12,498,449 B2
(45) Date of Patent: Dec. 16, 2025

(54) JOINT OFDM COMMUNICATION AND SENSING

(71) Applicant: NXP B.V., Eindhoven (NL)

(72) Inventors: Ashish Pandharipande, Eindhoven (NL); Wilhelmus Johannes van Houtum, Sint-oedenrode (NL)

(73) Assignee: NXP B.V., Eindhoven (NL)

( * ) Notice: Subject to any disclaimer, the term of this patent is extended or adjusted under 35 U.S.C. 154(b) by 330 days.

(21) Appl. No.: 18/206,387

(22) Filed: Jun. 6, 2023

(65) Prior Publication Data

US 2024/0410973 A1    Dec. 12, 2024

(51) Int. Cl.
*G01S 7/00*     (2006.01)
*G01S 13/58*    (2006.01)

(52) U.S. Cl.
CPC .............. *G01S 7/006* (2013.01); *G01S 13/58* (2013.01)

(58) Field of Classification Search
CPC .................................. G01S 7/006; G01S 13/58
See application file for complete search history.

(56) References Cited

U.S. PATENT DOCUMENTS

| | | | | |
|---|---|---|---|---|
| 2009/0225899 A1* | 9/2009 | Dent | ................. | H04L 25/03343 375/296 |
| 2010/0074358 A1* | 3/2010 | Khojastepour | ....... | H04L 25/022 375/267 |
| 2011/0129031 A1* | 6/2011 | van de Beek | ....... | H04L 27/2627 375/295 |
| 2011/0193739 A1* | 8/2011 | Strauch | ............... | H04L 27/2647 342/146 |
| 2012/0250801 A1* | 10/2012 | Lee | .................... | H04L 25/03159 375/340 |
| 2020/0336348 A1* | 10/2020 | Razavi | ................. | H04B 17/336 |

OTHER PUBLICATIONS

Dokhanchi, S., "Performance Analysis of Zero-Padded Sequences for Joint Communications and Sensing", IEEE Transactions on Signal Processing, vol. 71, May 2023.
Zhang, T., "OFDM Synthetic Aperture Radar Imaging With Sufficient Cyclic Prefix", IEEE Transactions on Geoscience and Remote Sensing, vol. 53, No. 1, Jan. 2015.

(Continued)

*Primary Examiner* — William Kelleher
*Assistant Examiner* — Hailey R Le

(57) ABSTRACT

A first device operates to utilize RF signaling for both communication signaling and radar sensing. The first device transmits a first RF signal representing a first OFDM symbol at time index k−1 and transmits a second RF signal representing a second OFDM symbol at time index k. The first and second OFDM symbols represent communication data for receipt by at least a second device, and have cyclic prefixes of a length less than a channel length used for radar sensing by the JCAS device. A third RF signal that is a scattered representation of the second RF signal is received at the first device, and a compensation matrix determined from at least both the first and second OFDM symbols is used to compensate for ISI present in the third RF signal. From this compensated result a set pf radar channel coefficients representing the local environment are determined.

18 Claims, 5 Drawing Sheets

(56) References Cited

OTHER PUBLICATIONS

Barneto, C. B. et al., "Beamformer Design and Optimization for Joint Communication and Full-Duplex Sensing at mm-Waves," IEEE Transactions on Communications, vol. 70, No. 12; Sep. 13, 2021; pp. 8298-8312.

De Oliveira, L. G. et al., "Joint Radar-Communication Systems: Modulation Schemes and System Design," IEEE Transactions on Microwave Theory and Techniques, vol. 70, No. 3; Nov. 2021; pp. 1521-1551.

Hakobyan, Gor, "Orthogonal Frequency Division Multiplexing Multiple-Input Multiple-Output Automotive Radar with Novel Signal Processing Algorithms," PhD Dissertation, University of Stuttgart; Apr. 2018; 188 pages.

Liu, F. et al., "Joint Radar and Communication Design: Applications, State-of-the-Art, and the Road Ahead," IEEE Transactions on Communications, vol. 68, No. 6; Jun. 3, 2019; pp. 3834-3862.

Liyanaarachchi, S.D. et al., "Optimized Waveforms for 5G-6G Communication with Sensing: Theory, Simulations and Experiments," IEEE Transactions on Wireless Communications, vol. 20, No. 12; Dec. 2021; pp. 8301-8315.

Mishra, K. V. et al., "Toward Millimeter-Wave Joint Radar Communications: A Signal Processing Perspective," IEEE Signal Processing Magazine, vol. 36, No. 5; May 18, 2019; pp. 100-114.

Sturm, C. et al., "A Novel Approach to OFDM Radar Processing," IEEE Radar Conference; May 4-8, 2009; 4 pages.

Sturm, C. et al., "Waveform Design and Signal Processing Aspects for Fusion of Wireless Communications and Radar Sensing," Proceedings of the IEEE, vol. 99, No. 7; May 27, 2011; pp. 1236-1259.

Wild, T. et al., "Joint Design of Communication and Sensing for Beyond 5G and 6G systems," IEEE Access, vol. 9, Feb. 15, 2015; pp. 30845-30857.

Wu, K. et al., "Integrating Low-Complexity and Flexible Sensing into Communication Systems," IEEE Journal on Selected Areas in Communications, vol. 40, No. 6; Sep. 9, 2021; pp. 1873-1889.

Xu, T et al., "Proof of Concept Experiments of Joint Waveform Design for Integrated Sensing and Communications," Proceedings of the 1st ACM MobiCom Workshop on Integrated Sensing and Communications Systems; Oct. 21, 2022; pp. 25-30.

Zhang, J.A., et al., "An Overview of Signal Processing Techniques for Joint Communication and Radar Sensing," IEEE Journal of Selected Topics in Signal Processing, vol. 15, No. 6; Nov. 2021; pp. 1295-1315.

U.S. Appl. No. 18/045,912, filed Oct. 12, 2022, entitled "Systems and Methods for Joint Communication and Sensing", and having as inventors Ashish Pandharipande, et al.

European Application No. 22211209.6 filed on Dec. 2, 2022, entitled, "An Apparatus for Communication and Sensing", and having as inventors Wilhelmus Johannes van Houtum, et al.

* cited by examiner $$H = \begin{bmatrix} h_0 & 0 & \cdots & 0 & h_{L-1} & h_{L-2} & \cdots & h_1 \\ h_1 & h_0 & 0 & \cdots & 0 & h_{L-1} & \cdots & h_2 \\ \vdots & \ddots & \ddots & \ddots & \ddots & \ddots & \cdots & \vdots \\ h_{L-1} & h_{L-2} & \cdots & h_0 & 0 & \cdots & \cdots & 0 \\ 0 & h_{L-1} & h_{L-2} & \cdots & h_0 & 0 & \cdots & 0 \\ \vdots & \ddots & \ddots & \ddots & \ddots & \ddots & \cdots & \vdots \\ 0 & \cdots & 0 & h_{L-1} & h_{L-2} & \cdots & \cdots & h_0 \end{bmatrix}$$

$$C = \begin{bmatrix} 0 & \cdots & h_{L-1} & \cdots & \cdots & h_p & 0 & \cdots & 0 \\ 0 & \cdots & 0 & h_{L-1} & \cdots & h_{p+1} & 0 & \cdots & 0 \\ \vdots & \ddots & \ddots & \ddots & \ddots & \vdots & \vdots & \vdots & \vdots \\ 0 & \cdots & 0 & \cdots & 0 & h_{L-1} & 0 & \cdots & 0 \\ 0 & \cdots & 0 & \cdots & \cdots & 0 & 0 & \cdots & 0 \\ \vdots & \ddots & \ddots & \ddots & \ddots & \vdots & \vdots & \vdots & \vdots \\ 0 & \cdots & 0 & \cdots & \cdots & 0 & 0 & \cdots & 0 \end{bmatrix}$$

$$S = \begin{bmatrix} 0 & \cdots & 0 & h_{L-1} & \cdots & \cdots & h_p \\ 0 & \cdots & 0 & 0 & h_{L-1} & \cdots & h_{p+1} \\ \vdots & \ddots & \ddots & \ddots & \ddots & \ddots & \vdots \\ 0 & \cdots & 0 & \cdots & \cdots & 0 & h_{L-1} \\ 0 & \cdots & 0 & \cdots & \cdots & 0 & 0 \\ \vdots & \ddots & \ddots & \ddots & \ddots & \ddots & \vdots \\ 0 & \cdots & 0 & \cdots & \cdots & 0 & 0 \end{bmatrix}$$

JOINT OFDM COMMUNICATION AND SENSING

BACKGROUND

Joint communication and sensing (JCAS) systems leverage wireless communication systems to not only provide for communications but for radar sensing of objects in the surrounding environment. Orthogonal frequency division multiplexing (OFDM) transmission schemes are of particular interest for use in JCAS systems due to OFDM signaling being tolerant of Doppler shift and effectively free of range-Doppler coupling, in addition to OFDM signaling being the basis of RF signaling for many wireless protocols, including for wireless local area networks (such as the Institute of Electrical and Electronic Engineers (IEEE) 802.11 suite of protocol) and for cellular networks (such as the Third Generation Partnership Protocol (3GPP) Fourth Generation Long Term Evolution (4G LTE) protocols). The multipath environment in which most OFDM-based communications operates introduces the risk of inter-symbol interference (ISI). Radar sensing using OFDM-based RF signaling is particularly susceptible to ISI due to the longer channel length typically present due to the out-and-back nature of radar sensing. Therefore, it is desirable to mitigate ISI for communications and sensing purposes without sacrificing communications efficiency and radar sensing range.

SUMMARY OF EMBODIMENTS

The present disclosure is better understood in view of the following examples, considered individually or in various combinations:

Example 1: A method comprising: transmitting, by a first device, a first radio frequency (RF) signal representing a first orthogonal frequency division multiplication (OFDM) symbol at first time index; transmitting, by the first device, a second RF signal representing a second OFDM symbol at second time index; receiving, at the first device, a third RF signal, the third RF signal representing a scattered representation of the second RF signal by one or more objects in a local environment of the first device; and determining a set of radar channel coefficients representing the local environment of the first device based on at least the third RF signal, the first OFDM symbol, and the second OFDM symbol.

Example 2: The method of Example 1, wherein each of the first RF signal and second RF signal represents corresponding communication data for receipt by a second device.

Example 3: The method of Example 2, wherein: the first RF signal and second RF signal each have a cyclic prefix of a length shorter than a channel length for radar sensing by the first device in the local environment; and determining the set of radar channel coefficients includes: determining a compensation matrix from at least the first OFDM symbol and the second OFDM symbol; and compensating for intersymbol interference (ISI) present in the third RF signal using the compensation matrix.

Example 4. The method of Example 3, wherein the compensation matrix is represented in an expression:

$$y_k = Xh_k + w_k,$$

where X represents the compensation matrix composed of OFDM symbol samples from at least the first and second OFDM symbols, $h_k$ represents a vector of the radar channel coefficients for the second time index, $w_k$ represents a noise vector, and $y_k$ represents a vector of received OFDM symbol samples extracted from the third RF signal.

Example 5. The method of Example 4, wherein the compensation matrix is represented as:

$$X_k = \begin{bmatrix} x_k[0] & x_k[N-1] & \ldots & x_k[N-P] & x_{k-1}[N-1] & x_{k-1}[N-2] & \ldots & x_{k-1}[P+1] \\ x_k[1] & x_k[0] & \ldots & x_k[N-P+1] & x_k[N-P] & x_{k-1}[N-1] & \ldots & x_{k-1}[P+2] \\ x_k[2] & x_k[1] & \ldots & x_k[N-P+2] & x_k[N-P+1] & \vdots & \ldots & x_{k-1}[P+3] \\ \vdots & \vdots & \ldots & \vdots & \vdots & \vdots & \ldots & \vdots \\ \vdots & \vdots & \ldots & \vdots & \vdots & \vdots & \ldots & x_{k-1}[N-1] \\ \vdots & \vdots & \ldots & \vdots & \vdots & \vdots & \ldots & x_k[N-P] \\ \vdots & \vdots & \ldots & x_k[N-1] & x_k[N-2] & \vdots & \ldots & \vdots \\ \vdots & \vdots & \ldots & x_k[0] & x_k[N-1] & \vdots & \ldots & \vdots \\ \vdots & \vdots & \ldots & x_k[1] & x_k[0] & \vdots & \ldots & \vdots \\ \vdots & \vdots & \ldots & \vdots & \vdots & \vdots & \ldots & \vdots \\ x_k[N-1] & x_k[N-2] & \ldots & x_k[N-P-1] & x_k[N-P-2] & x_k[N-P-3] & \ldots & x_k[0] \end{bmatrix}$$

where $x_k$ represents the compensation matrix, $x_{k-1}$ represents the first OFDM symbol, $x_k$ represents the second OFDM symbol, N is the length of the first and second OFDM symbols, and P is the length of the cyclic prefix.

Example 6: The method of Example 4, wherein the vector $h_k$ is a sparse vector and determining the radar channel coefficients comprises determining the vector $h_k$ using a sparse reconstruction scheme.

Example 7. The method of Example 3, wherein determining the radar channel coefficients comprises estimating the radar channel coefficients based on an expression:

$$\widehat{h_k} = X^+ y_k,$$

where $\widehat{h_k}$ represents the estimated radar channel coefficients and X+ is a pseudo-inverse matrix of the compensation matrix.

Example 8: The method of Example 3, wherein the length of the cyclic prefix is set for a channel length of a communication environment between the first device and the second device.

Example 9: The method of Example 1, further comprising: determining one or both of a relative distance or a relative velocity of each of one or more objects in the local environment based on the radar channel coefficients.

Example 10: A device comprising: a memory; a first radio frequency (RF) front end; a second RF front end; and a modem coupled to the first RF front end and the second RF front end, the modem configured to: control the first RF front end to transmit a first RF signal representing a first orthogonal frequency division multiplication (OFDM) symbol at a first time index and to transmit a second RF signal representing a second OFDM symbol at a second time index; control the second RF front end to receive a third RF signal, the third RF signal representing a scattered representation of the second RF signal by one or more objects in a local environment of the device; and determine a set of radar channel coefficients representing the local environment of the device based on at least the third RF signal, the first OFDM symbol, and the second OFDM symbol.

Example 11: The device of Example 10, wherein each of the first RF signal and second RF signal represents corresponding communication data for receipt by another device.

Example 12: The device of Example 11, wherein: the first RF signal and second RF signal each have a cyclic prefix of a length shorter than a channel length for radar sensing by the device in the local environment; and the modem is configured to determine the set of radar channel coefficients representing the local environment by: determining a compensation matrix from at least the first OFDM symbol and the second OFDM symbol; and compensating for intersymbol interference (ISI) present in the third RF signal using the compensation matrix.

Example 13. The device of Example 12, wherein the compensation matrix is represented in an expression:

$$y_k = Xh_k + w_k,$$

where X represents the compensation matrix composed of OFDM symbol samples from at least the first and second OFDM symbols, $h_k$ represents a vector of the radar channel coefficients for the second time index, $w_k$ represents a noise vector, and $y_k$ represents a vector of received OFDM symbol samples extracted from the third RF signal.

Example 14: The device of Example 13, wherein the vector $h_k$ is a sparse vector and determining the radar channel coefficients comprises determining the vector $h_k$ using a sparse reconstruction scheme.

Example 15. The device of Example 12, wherein determining the radar channel coefficients comprises estimating the radar channel coefficients based on an expression:

$$\widehat{h_k} = X^+ y_k,$$

where $\widehat{h_k}$ represents the estimated radar channel coefficients and X+ is a pseudo-inverse matrix of the compensation matrix.

Example 16: The device of Example 12, wherein the length of the cyclic prefix is set for a channel length of a communication environment between the device and another device.

Example 17: The device of Example 10, wherein the device is configured to determine one or both of a relative distance or a relative velocity of each of one or more objects in the local environment based on the radar channel coefficients.

Example 18: A non-transitory computer-readable medium storing a set of instructions that are configured to manipulate at least one processor and one or more radio frequency (RF) front ends of a device to determine a set of radar channel coefficients representing a local environment of the device based on at least a first OFDM symbol transmitted by the device as a first RF signal, a second OFDM symbol transmitted by the device as a second RF signal, and a third RF signal received by the device based on a reflection of the second RF signal by one or more objects in the local environment.

Example 19: The non-transitory computer-readable medium of Example 18, wherein the set of instructions are further configured to manipulate the at least one processor to: determine one or both of a relative distance or a relative velocity of each of one or more objects in the local environment based on the radar channel coefficients.

Example 20: The non-transitory computer-readable medium of Example 18, wherein each of the first RF signal and second RF signal represents corresponding communication data for receipt by another device.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

FIG. 4 is a diagram illustrating various matrices that may be used in a vector representation of a received OFDM symbol vector representing a received scattered RF signal in accordance with some embodiments.

FIG. 5 is a diagram illustrating an example matrix representation of a vector representation of a received OFDM symbol vector representing a received scattered RF signal in accordance with some embodiments.

DETAILED DESCRIPTION

Figure 1:
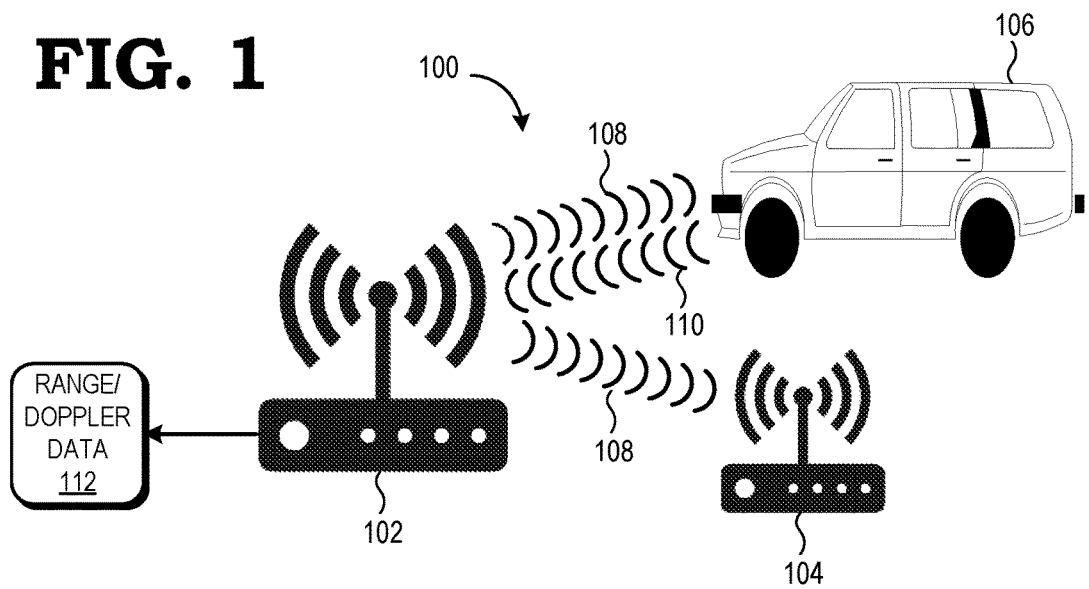
FIG. 1 is a diagram illustrating a joint communication and sensing (JCAS) system utilizing OFDM signaling for both communications and radar sensing in accordance with some embodiments.

In a JCAS scheme, a transmitting device generates and transmits an OFDM signal representing a sequence of OFDM symbols (which in turn represent a set of communication data). For communication purposes, the OFDM signal is received at a receiving device, which processes the OFDM signal to extract the set of communication data represented therein. However, this same OFDM signal is scattered by at least one object in the local environment of the transmitting device. Accordingly, the transmitting device may also receive the scattered OFDM signal and extract the OFDM symbols represented in the scattered OFDM signal. From the differences between the originally transmitted OFDM symbols and the received OFDM symbols, the transmitting device can estimate the distance and speed of the object.

The transmission of an RF signal representing an ODFM symbol runs the risk of ISI. To mitigate ISI, OFDM employs a guard interval after (or before) every OFDM symbol in which a cyclic prefix (CP) is inserted, with the CP typically being a replication of a portion of the OFDM symbol to facilitate simplified frequency domain processing of the received signal. In order to be effective for ISI mitigation, the length of the CP is commensurate with the expected length of the multipath environment, which in a communications mode is the multipath length between the transmitting device and the receiving device. However, radar sensing is based on time-of-flight between transmission of a signal, scattering of the signal, and receipt of the scattered signal. As such, the multipath length in a radar sensing mode often is considerably longer than the multipath length in communication mode. Thus, a conventional approach to providing a CP of sufficient length for an OFDM signal concurrently used for both communications and sensing is to set the CP length based on the expected maximum multipath length for radar sensing. While effective at mitigating ISI for both communications and sensing purposes, this longer CP length degrades both the power and data throughput efficiency for communications purposes, and thus requires a tradeoff between communications efficiency and radar sensing range.

Conventional OFDM-based JCAS systems assume negligible ISI for both processing of OFDM signaling for communications purposes and for radar sensing purposes, and this assumption is predicated on us of a CP of sufficient length to mitigate ISI in the longer multipath scenario of radar sensing at the expense of data throughput and power efficiency for data transmission. The present disclosure describes systems and techniques for joint communication and sensing using OFDM signaling in which radar sensing functionality is provided with relatively minimal impact on concurrent data transmission functionality, including facilitating the use of a CP of a length tailored to the multipath environment expected for the data transmission functionality instead of the longer multipath environment expected for radar sensing. In this approach, the radar sensing process expects and accommodates for ISI introduced by the use of a CP that is insufficient to mitigate ISI in the longer radar sensing environment by leveraging the sensing device's knowledge of not only the current transmitted OFDM symbol but also one or more previously-transmitted OFDM symbols to correlate the OFDM symbol from the reflected/scattered OFDM signal with the present and previously-transmitted OFDM symbols. In embodiments, a compensation matrix (matrix X, which is described in greater detail herein) is determined based solely on the current OFDM symbol and one or more previous OFDM symbols so as to compensate for the ISI that is likely to be present when the radar-sensing channel is longer than the channel length compensated for by the inserted CP. Note that while the following describes example implementations in which a single previous OFDM symbol is used in conjunction with the current OFDM symbol to generate the compensation matrix, embodiments are not limited to these example implementations and thus more than one previous OFDM symbol can be employed in characterizing the local environment for radar sensing purposes (e.g., via generation of a compensation matrix that is determined based on the current OFDM symbol and j previous OFDM symbols, j>1), using the same principles and guidelines provided below.

FIG. 1 illustrates an example JCAS system 100 utilizing a concurrent radar sensing mode with ISI compensation in accordance with some embodiments. The JCAS system 100 includes a JCAS device 102 employing OFDM signaling for both transmission of data to at least a second device 104 and for radar sensing of objects, such as object 106, in a local environment of the JCAS device 102. To illustrate, the JCAS system 100 may be a cellular system in which the JCAS device 102 is a base station and the device 104 is a user equipment (UE), with the base station utilizing OFDM signaling to communicate data to the UE in accordance with, for example, a 4G LTE cellular protocol or a 3GPP Fifth Generation New Radio (5G NR) protocol, while also attempting to sense the range and velocity of objects in the local environment utilizing the same OFDM signaling. Alternatively, the JCAS device 102 could be the UE and the device 104 the base station. As yet another example, the JCAS system 100 could be a wireless local area network (WLAN) system using OFDM-based IEEE 802.11 wireless transmissions to communicate data with the device 104 in the form of a UE, while also using the same OFDM signaling to sense objects in the local environment.

In operation, the JCAS device 102 converts a set of data for transmission to the device 104 to a sequence of one or more OFDM symbols, which is then converted to an analog signal that is modulated with a carrier frequency signal to generate a radio frequency (RF) signal 108, which is emitted by the JCAS device 102 and propagated through the local environment. The device 104 receives the emitted RF signal 108 and processes the RF signal 108 to extract the set of data for further processing. Further, the emitted RF signal 108 is scattered by objects in the local environment, such as object 106 (e.g., a vehicle). The resulting scattered RF signal 110 is propagated to the JCAS device 102, whereupon the JCAS device 102 processes the scattered RF signal 110 to determine either or both of a range (distance) or a velocity of the object 106 relative to the JCAS device 102 (as range/doppler data 112 using the techniques described herein. The range/doppler data 112 then may be used by the JCAS device 102 to modify one or more of its operations. For example, the range/doppler data 112 may inform the JCAS device 102 of a relative location of an interfering object, in response to which the JCAS device 102 may modify one or more of its transmission parameters, such as transmission power, beam direction, etc., to compensate for the interfering object. As another example, the JCAS device 102 may be a vehicle that implements some form of autonomous driving, and the relative distance and speed of objects identified in the range/doppler data 112 may inform one or more driving operations of the vehicle. Still further, the JCAS device 102 may transmit the range/doppler data 112 to other devices for their own use.

Figure 2:
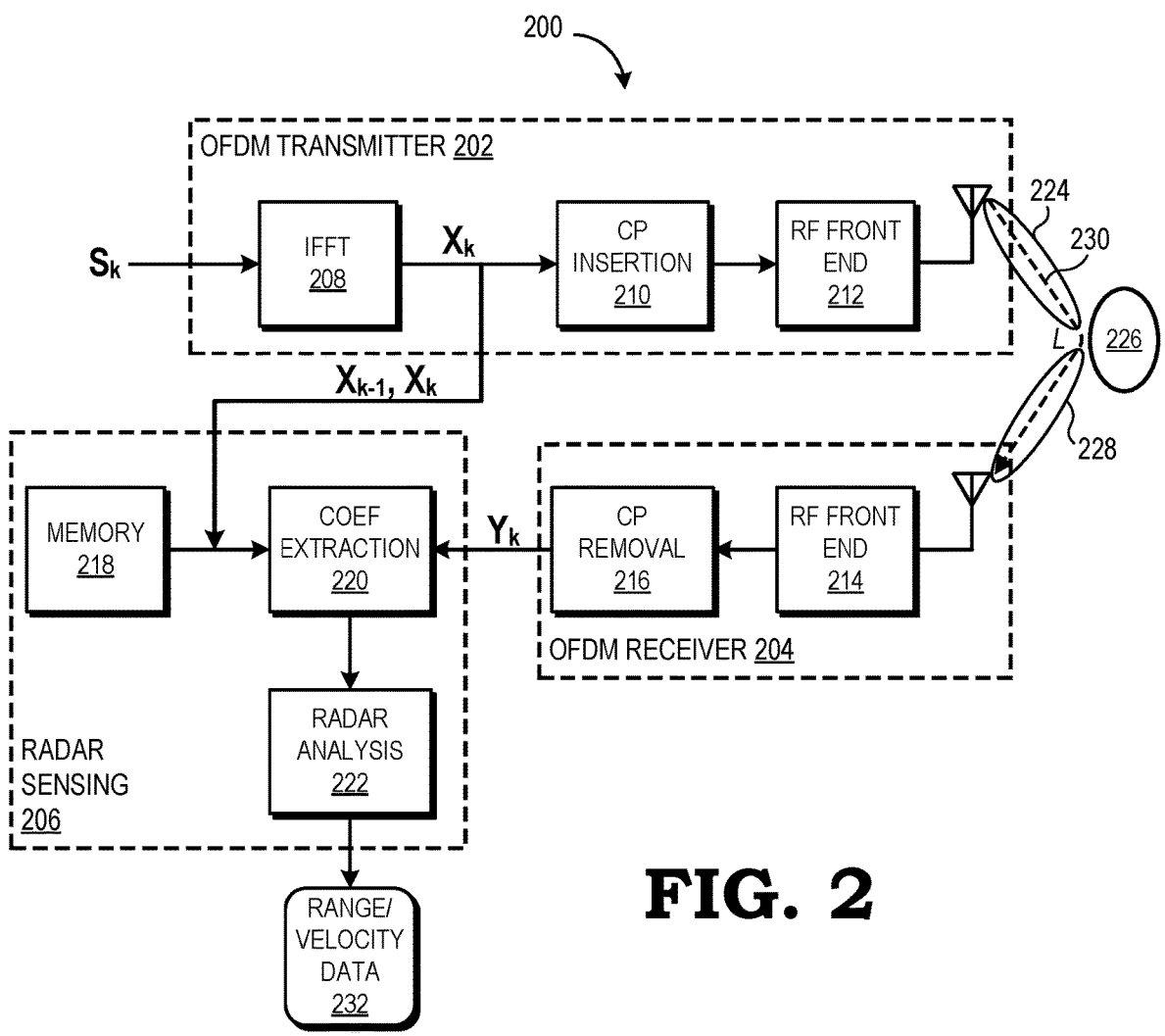
FIG. 2 is a diagram illustrating an OFDM subsystem of a JCAS device of the system of FIG. 1 utilizing transmitted ODFM symbol history to compensate for the presence of ISI during radar sensing in accordance with some embodiments.
Figure 3:
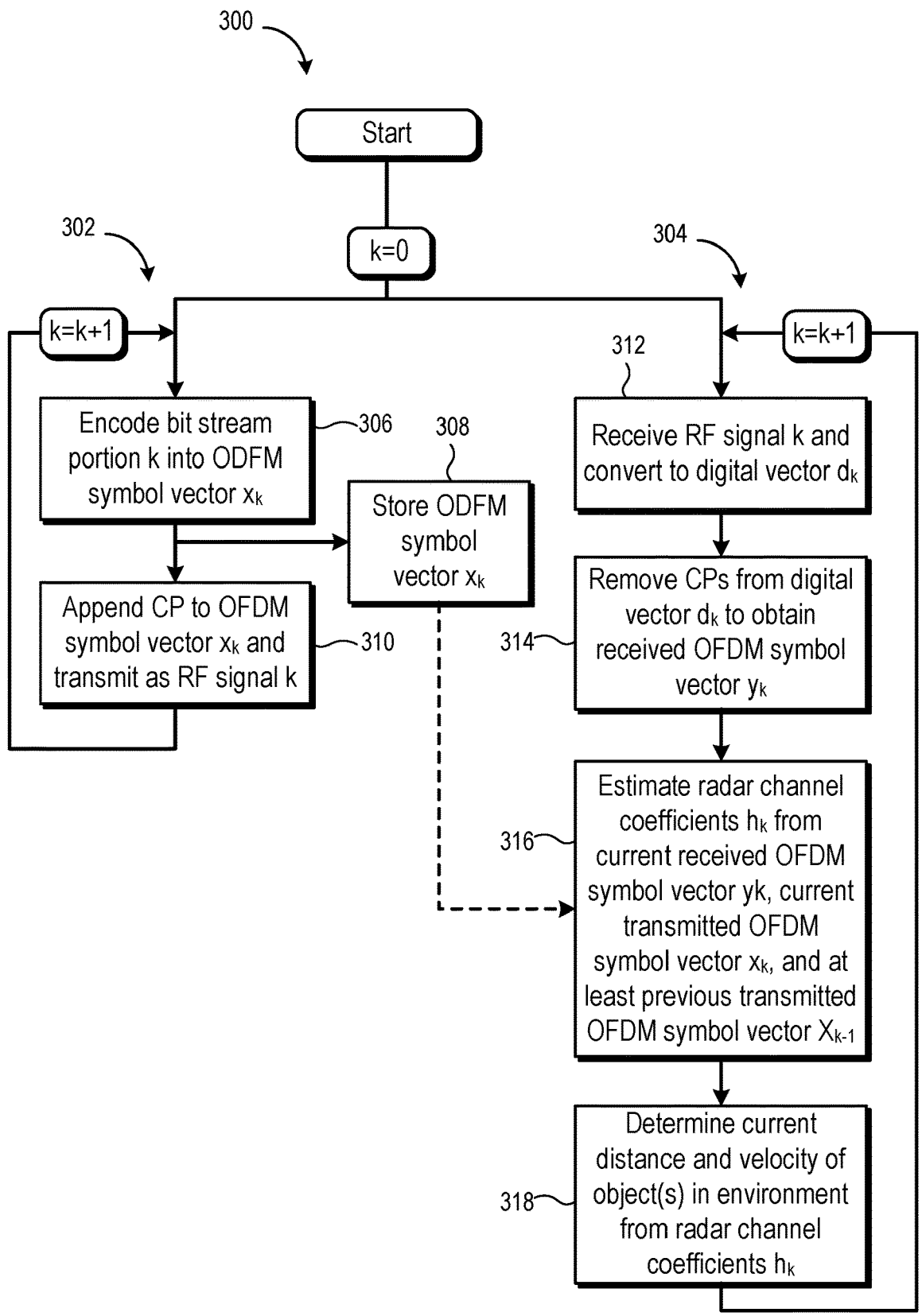
FIG. 3 is a flow diagram illustrating a method of operation of the JCAS device of FIG. 2 for concurrent OFDM-based data communication signaling and radar sensing in accordance with some embodiments.

FIGS. 2 and 3 together illustrate a general overview of the radar sensing process employed by the JCAS device 102 with reference to a diagram 200 of FIG. 2 representing various components of the JCAS device 102 involved in the radar sensing and a method 300 of FIG. 3 illustrating an operation of the JCAS device 102. As shown in FIG. 2, the JCAS device 102 includes an OFDM-based transmitter path 202 and an OFDM-based receiver path 204 (hereinafter, "transmitter path 202" and "receiver path 204" for purposes of brevity), as well as a radar sensing path 206. The transmitter path 202 includes an inverse fast Fourier transform (IFFT) component 208, a CP insertion component 210, and an RF front end 212. The receiver path 206 includes an RF frontend 214 and a CP removal component 216. The radar sensing path 206 includes a memory 218 (e.g., random access memory, a set of registers, a hard disk drive, etc.), a radar coefficient extraction component 220, and a radar analysis component 222. The RF frontends 212 and 214 typically are implemented using well-known RF hardware, such as digital-to-analog converters (DACs), signal generators, modulators/mixers, low pass filters (LPFs), antenna arrays, and the like. The components 208, 210, 216, 220, and 222 each may be implemented as hardcoded logic, one or more processors executing software, programmable logic, or combinations thereof. For example, in one implementation the IFFT component 208 and CP insertion component 210 may be implemented in one application specific integrated circuit (ASIC) while the CP removal component 216 may be implemented in the same or different ASIC, while the radar coefficient extraction component 220 and radar analysis component 222 are implemented via a processor executing software instructions to provide the functionality described herein. An example hardware implementation of the JCAS device 102 is described in greater detail below with reference to FIG. 4.

The method 300 of FIG. 3 illustrates a general overview of the operation of the JCAS device 102 of FIGS. 1 and 2. At startup or for the initiation of the process for transmission of an ODFM frame containing ODFM symbol representing communication data, a time index k is set to an initial value (e.g., k=0) and a transmission subprocess 302 and a radar subprocess 304 performed in parallel for each increment of time index k. Thus, the receiver path 204 is activated during RF transmission by the transmitter path 202 for radar sensing purposes. The transmission subprocess 302 depicts a process for transmitting an OFDM-based RF signal that serves two purposes: as a carrier of communications data for receipt by another device; and as a radar signal for radar sensing. As such, for the transmission subprocess 302 the transmitter path 202 receives a data input in the form of a sequence of bits representing communication data (e.g., from an application executing at the JCAS device 102) and from this data input generates, based on OFDM principles, an RF signal (e.g., RF signal 108, FIG. 1) that is emitted into the local environment. For the radar sensing subprocess 304, the JCAS device 102 repurposes a portion of the receiver path 204 along with use of the radar sensing path 206, to perform radar processing on RF signaling received via the receiver path 204 as a result of scattering/reflection of RF signaling concurrently transmitted by the transmitter path 202.

Starting with the transmission subprocess 302, at block 306, an input of transmission bits of a data stream is parallelized in the transmission path 202 into N channels (N>1 and typically an exponent of 2, and representing the N subchannels that will be present in the resulting OFDM symbol) and encoded using, for example, quadrature amplitude modulation (QAM) or phase shift keying (PSK) into a data symbol N×1 vector, denoted $s_k$ for time index k. The IFFT component 208 performs an inverse fast Fourier transform (IFFT) on the data symbol vector $s_k$, resulting in an OFDM symbol N×1 vector, denoted $x_k$, for time index k. As each OFDM symbol vector $x_k$ is generated, a copy of the OFDM symbol vector $x_k$ is stored in a corresponding data structure in the memory 218 of the radar sensing path 206 at block 308, for use in radar sensing as described below.

After the IFFT process, at block 310 the CP insertion component 210 appends prepends a cyclic prefix (CP) to each OFDM symbol in the OFDM symbol vector $x_k$. Typically the CP is a copy of an end portion of the OFDM symbol so that a receiver receiving the resulting RF signal will be able to integrate over an integer number of sinusoid cycles for each of the multipaths when the receiver performs OFDM demodulation with a fast Fourier transform (FFT). As described herein, the duration P of the inserted CP may be set based on the expected maximum multipath length of the communication channel between the JCAS device 102 and the device 104 intended to receive the resulting RF signaling for data communication purposes, rather than based on the expected maximum multipath length for radar sensing purposes, which typically is longer. That is, rather than implement a CP of sufficient duration to mitigate ISI in view of the longest expected multipath length for radar signaling purposes at the expense of power and data throughput efficiency for data communication purposes, the transmit path 202 of the JCAS device 102 can employ a CP of a shorter duration suited primarily for the expected multipath length for data communication purposes as the radar sensing process below compensates for ISI introduced when the multipath length for radar sensing exceeds the maximum length covered by the CP.

Following CP insertion, the OFDM symbol vector is provided to the RF frontend 212 of the transmitter path 202, whereupon the OFDM symbol vector is converted to analog signaling by a digital-to-analog (D/A) converter (not shown), the analog signaling is low-pass filtered by a low-pass filter (not shown), and the resulting filtered analog signaling is then modulated with a carrier signal having a frequency $f_c$ to generate an RF signal 224 (FIG. 2) (one embodiment of RF signal 108) emitted into the local environment by an antenna array of the RF front end 212. The RF signal 224 then propagates one or more receiving devices (e.g., device 104, FIG. 1), whereupon each receiving device processes the RF signal 224 to recover the original N bits in accordance with conventional OFDM signal processing. The time index k is then incremented (k=k+1) and the transmission subprocess 302 is repeated for the next set of N bits in the input data stream.

Concurrently with the generation and transmission of the RF signal 224 for time index k by the transmission subprocess 302, the radar sensing subprocess 304 operates to generate a radar profile of the local environment for the same time index k using scattering/reflection of the RF signal by objects in the local environment. Accordingly, at block 312, the receiver path 204 is activated concurrent with transmission so as to receive scattered representation(s) of the RF signal 224 for radar sensing purposes. For example, when the RF signal 224 encounters an object 226 (FIG. 2) in the local environment, the object 226 scatters the RF signal 224, resulting in a scattered RF signal 228 (FIG. 2) (one embodiment of received RF signal 110) propagating back to the JCAS device 102 and being received at the RF frontend 214 of the receiver path 204. The RF frontend 214 converts the scattered RF signal 228 from an analog signal to a digital signal, which is parallelized into N channels, resulting in digital N×1 vector, denoted $d_k$ for time index k, with each channel representing a recovered OFDM symbol and a corresponding appended CP.

At block 314, the CP removal component 216 removes the CPs, resulting in a received OFDM symbol N×1 vector, denoted $y_k$ for time index k. Thus, it will be appreciated that the received OFDM symbol of the received OFDM symbol vector $y_k$ represents the original OFDM symbol transmitted by the transmitter path 202 for time index k as well as the transfer function of the propagation path, that is, of the local environment with the scattering object 226. Thus, at block 316 the radar sensing path 206 operates to extract a representation of this transfer function for the local environment based on correlation between the original OFDM symbol and the received OFDM symbol, and from this representation of the transfer function determine one or both of the range and velocity of scattering objects, such as scattering object 226, within the local environment, as described herein.

To that end, assume that the propagation channel of the transmitted RF signal 224 and the resulting scattered RF signal 228 through the local environment is represented as $h_k$ for time index k, with $h_k=[h_0, h_1, \ldots, h_{L-1}]^T$, in which L-1 is the round-trip channel length (e.g., multipath round-trip channel length 230, FIG. 2) and T is the elementary OFDM symbol duration, and $h_0, h_1, \ldots, h_{L-1}$ representing the L channel coefficients that characterize the radar path, and thus identified herein as the "radar channel coefficients." Thus, with the radar channel coefficients identified (and thus the radar channel estimated), range and/or velocity information for objects within the radar channel (that is, within the local environment) can be determined using any of a variety of well-known distance-speed analysis processes, as described herein.

Thus, to begin the radar sensing process for time index k, at block 316 the coefficient extraction component 220 extracts the radar channel coefficients $h_k$ from the OFDM symbol vector $y_k$ by leveraging the "knowledge" of not only the transmitted OFDM symbol $x_k$ in the RF signal 224 transmitted for the current time index k, but of the ODFM symbol $x_{k-1}$ in an RF signal transmitted by the previous iteration of the transmission subprocess 302 at time index k-1. By considering not only the present OFDM symbol but the most recent previous OFDM symbol (as well as, in some embodiments, one or more additional previous OFDM symbols), an accurate compensation matrix can be constructed so as to compensate for ISI likely introduced due to the CP length being shorter than the likely out-and-back channel length used for the radar sensing process (that is, the channel length of the radar sensing environment of the JCAS device 102).

The following describes one example approach to utilizing knowledge of both current and the recent historical transmitted OFDM symbols in order to estimate the radar channel coefficients. As identified in part above, the following notations are used:

N: number of ODFM subchannels $s_k$: data symbol N×1 vector at time index k $x_k$: transmitted ODFM symbol N×1 vector following N-point IFFT for time index k (containing N OFDM symbol samples)

L: round-trip channel length $h_k=[h_0, h_1, \ldots, h_{L-1}]$: radar channel coefficients for time index k P: cyclic prefix length $y_k$: received OFDM symbol N×1 vector at time index k (containing N OFDM symbol samples)

$w_k$: noise vector, such as additive white Gaussian noise

The received OFDM symbol vector yk can be represented in vector form as:

$$y_k = Hx_k - Cx_k + Sx_{k-1} + w_k \quad \text{(EQ. 1)}$$

where $x_k = W^H_{S_k}$ is the IFFT matrix used by the IFFT component 208 to generate the OFDM symbol samples of the OFDM symbol transmitted for time index k, and the structure of matrices H, C, and S are depicted below and are also shown in FIG. 4:

$$H = \begin{bmatrix} h_0 & 0 & \ldots & 0 & h_{L-1} & h_{L-2} & \ldots & h_1 \\ h_1 & h_0 & 0 & \ldots & 0 & h_{L-1} & \ldots & h_2 \\ \vdots & \ddots & \ddots & \ddots & \ddots & \ddots & \ldots & \vdots \\ h_{L-1} & h_{L-2} & \ldots & h_0 & 0 & \ldots & \ldots & 0 \\ 0 & h_{L-1} & h_{L-2} & \ldots & h_0 & 0 & \ldots & 0 \\ \vdots & \ddots & \ddots & \ddots & \ddots & \ddots & \ldots & \vdots \\ 0 & \ldots & 0 & h_{L-1} & h_{L-2} & \ldots & \ldots & h_0 \end{bmatrix}$$

$$C = \begin{bmatrix} 0 & \ldots & h_{L-1} & \ldots & \ldots & h_P & 0 & \ldots & 0 \\ 0 & \ldots & 0 & h_{L-1} & \ldots & h_{P+1} & 0 & \ldots & 0 \\ \vdots & \ddots & \ddots & \ddots & \ddots & \vdots & \vdots & \vdots & \vdots \\ 0 & \ldots & 0 & \ldots & 0 & h_{L-1} & 0 & \ldots & 0 \\ 0 & \ldots & 0 & \ldots & \ldots & 0 & 0 & \ldots & 0 \\ \vdots & \ddots & \ddots & \ddots & \ddots & \vdots & \vdots & \vdots & \vdots \\ 0 & \ldots & 0 & \ldots & \ldots & 0 & 0 & \ldots & 0 \end{bmatrix}$$

$$S = \begin{bmatrix} 0 & \ldots & 0 & h_{L-1} & \ldots & \ldots & h_P \\ 0 & \ldots & 0 & 0 & h_{L-1} & \ldots & h_{P+1} \\ \vdots & \ddots & \ddots & \ddots & \ddots & \ddots & \vdots \\ 0 & \ldots & 0 & \ldots & \ldots & 0 & h_{L-1} \\ 0 & \ldots & 0 & \ldots & \ldots & 0 & 0 \\ \vdots & \ddots & \ddots & \ddots & \ddots & \ddots & \vdots \\ 0 & \ldots & 0 & \ldots & \ldots & 0 & 0 \end{bmatrix}$$

As noted above, in at least one embodiment the duration of the CP is selected to satisfy the maximum expected multipath length for communications purposes, rather than for radar purposes. In the event that the maximum multipath length L for radar purposes happens to be satisfied by the length P of the selected CP (that is, when L<=P), such as when the JCAS device 102 is in a small room but the communications channel path extends considerably further than the boundaries of the small room, then the C and S matrices become zero matrices. In such a case, the radar channel coefficients $h_k$ can be recovered in a straightforward manner, such as through frequency division of the transmitted OFDM symbol by the received OFDM symbol, as is known in the art.

However, since the radar reflections undergo two paths (time of flight back and forth) in the radar sensing environment, such as the transmission of RF signal 224 and resulting propagation of scattered RF signal 228 back, compared to communications signaling for the communications environment, the length L of the radar channel typically is greater than the duration P of the CP (assuming the duration P of the CP was selected for efficient data communication purposes), that is L>P. In such instances, this leads to an ISI component in the received signal $y_k$, which is represented by the component $Sx_{k-1}$ and thus captured by the matrix S. Moreover, the structure of the vector form of $y_k$ as represented by equation EQ. 1 is written to decompose the non-ISI component into a circulant part (H) and a correction part (C). As a result, as represented by equation EQ. 2 below, the received signal can be written as a product of a two-symbol-matrix X, which contains the current transmitted OFDM symbol $x_k$ and the previously transmitted OFDM symbol $x_{k-1}$, and the radar channel coefficient vector $h_k$:

$$y_k = Xh_k + w_k \quad \text{(EQ. 2)}$$

where the matrix X is the compensation matrix and contains as elements known symbol samples from the symbol set $\{x_{k-1}, x_k\}$, and is a shifted version of this symbol set, with $$X_k = A_k^T, \quad \text{(EQ. 3)}$$

and $$A_k = \begin{bmatrix} x_k[0] & \cdots & x_k[N-1] \\ x_k[N-1] & \cdots & x_k[N-2] \\ \vdots & \vdots & \vdots \\ x_k[N-P] & \cdots & x_k[N-P-1] \\ x_{k-1}[N-1] & x_k[N-P+1] \cdots & x_k[N-P-2] \\ \vdots & \ddots & \vdots \\ x_{k-1}[P+1] & x_{k-1}[N-1] x_k[N-P] \cdots x_k[N-1] & x_k[0] \end{bmatrix}$$

The resulting compensation matrix $x_k$ thus is:

$$X_k = \begin{bmatrix} x_k[0] & x_k[N-1] & \cdots & x_k[N-P] & x_{k-1}[N-1] & x_{k-1}[N-2] & \cdots & x_{k-1}[P+1] \\ x_k[1] & x_k[0] & \cdots & x_k[N-P+1] & x_k[N-P] & x_{k-1}[N-1] & \cdots & x_{k-1}[P+2] \\ x_k[2] & x_k[1] & \cdots & x_k[N-P+2] & x_k[N-P+1] & \vdots & \cdots & x_{k-1}[P+3] \\ \vdots & \vdots & \cdots & \vdots & \vdots & \vdots & \cdots & \vdots \\ \vdots & \vdots & \cdots & \vdots & \vdots & \vdots & \cdots & x_{k-1}[N-1] \\ \vdots & \vdots & \cdots & \vdots & \vdots & \vdots & \cdots & x_k[N-P] \\ \vdots & \vdots & \cdots & \vdots & \vdots & \vdots & \cdots & \vdots \\ \vdots & \vdots & \cdots & x_k[N-1] & x_k[N-2] & \vdots & \cdots & \vdots \\ \vdots & \vdots & \cdots & x_k[0] & x_k[N-1] & \vdots & \cdots & \vdots \\ \vdots & \vdots & \cdots & x_k[1] & x_k[0] & \vdots & \cdots & \vdots \\ \vdots & \vdots & \cdots & \vdots & \vdots & \vdots & \cdots & \vdots \\ x_k[N-1] & x_k[N-2] & \cdots & x_k[N-P-1] & x_k[N-P-2] & x_k[N-P-3] & \cdots & x_k[0] \end{bmatrix}$$

To understand the structure of the compensation matrix $X_k$ more fully, consider a simple example in which N=8, L=5, and P=3, which case the expression for $y_k$ as represented by EQ. 2 becomes (see also FIG. 5):

$$\begin{bmatrix} y_k[0] \\ y_k[1] \\ y_k[2] \\ y_k[3] \\ y_k[4] \\ y_k[5] \\ y_k[6] \\ y_k[7] \end{bmatrix} = \begin{bmatrix} x_k[0] & x_k[7] & x_k[6] & x_{k-1}[7] & x_{k-1}[6] \\ x_k[1] & x_k[0] & x_k[7] & x_k[6] & x_{k-1}[7] \\ x_k[2] & x_k[1] & x_k[0] & x_k[7] & x_k[6] \\ x_k[3] & x_k[2] & x_k[1] & x_k[0] & x_k[7] \\ x_k[4] & x_k[3] & x_k[2] & x_k[1] & x_k[0] \\ x_k[5] & x_k[4] & x_k[3] & x_k[2] & x_k[1] \\ x_k[6] & x_k[5] & x_k[4] & x_k[3] & x_k[2] \\ x_k[7] & x_k[6] & x_k[5] & x_k[4] & x_k[3] \end{bmatrix} \cdot \begin{bmatrix} h_0 \\ h_1 \\ h_2 \\ h_3 \\ h_4 \end{bmatrix} + \begin{bmatrix} w_k[0] \\ w_k[1] \\ w_k[2] \\ w_k[3] \\ w_k[4] \\ w_k[5] \\ w_k[6] \\ w_k[7] \end{bmatrix}$$

Figure 5:
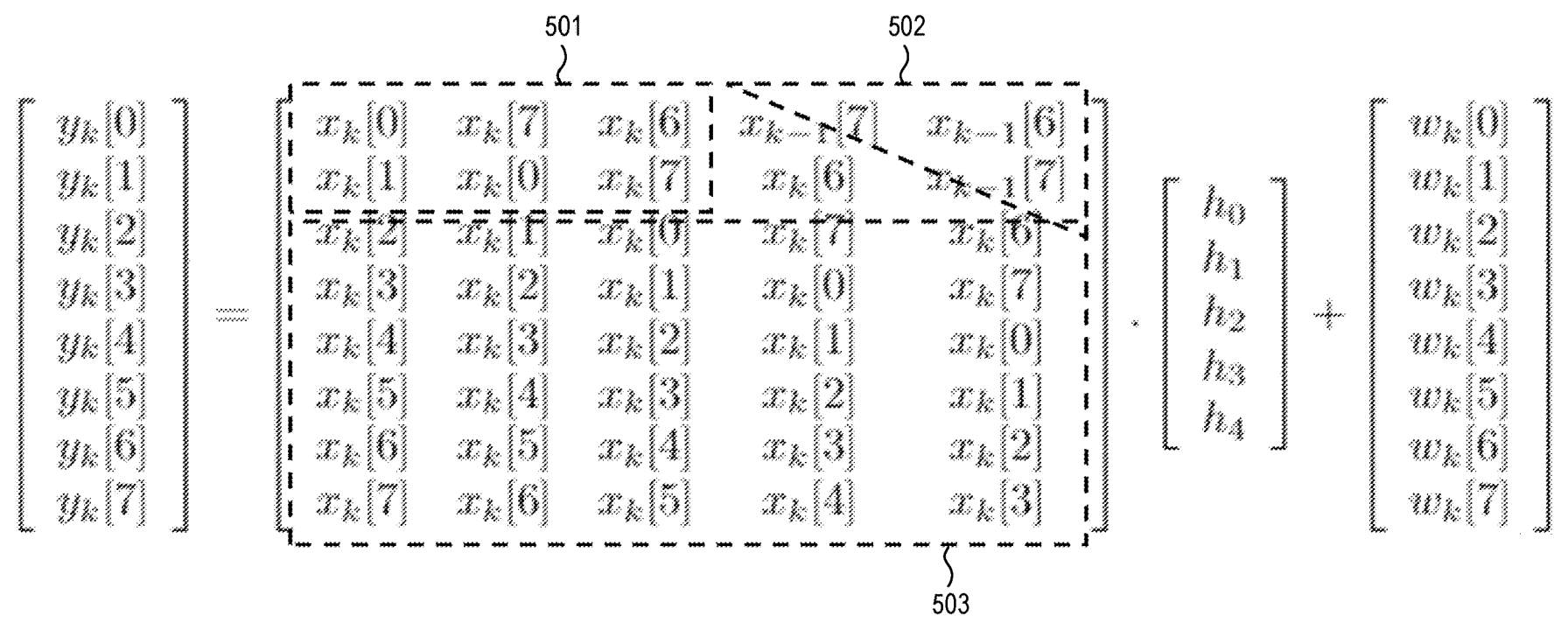

As shown in FIG. 5, the current OFDM symbol $x_k$ samples included in the rectangular region 501 of the example matrix X are a result of the circulant shift of the matrix H and the triangular structure of matrix C, the previous OFDM symbols $x_{k-1}$ samples included in the triangular region 502 are a result of the upper triangular structure of the ISI matrix S, and the current OFDM symbol $x_k$ samples included in the rectangular region 503 are a result of the circulant shift structure of matrix H.

With the representation of the received OFDM symbol vector $y_k$ presented by equation EQ. 2, the coefficient extraction component 220 can extract the radar channel coefficients $h_k$ using equation EQ. 2 and any of a variety of suitable channel coefficient recovery schemes, such as a maximum-likelihood (ML)-based recovery scheme $$\left( \text{e.g., } \hat{h}_k = \underset{h_k}{\operatorname{argmin}} \| y_k - X h_k \|^2 \right)$$

or a minimum mean-squared error (MMSE)-based recovery scheme (e.g., $\hat{h}_k = X^\dagger y_k = (X^H X)^{-1} X^H y_k$), so long as L<=N.

To illustrate, the radar channel coefficients could be efficiently estimated by employing the following relationship:

$$\hat{h_k} = X^+ y_k, \quad \text{(EQ. 4)}$$

where $\hat{h_k}$ denotes the estimated radar channel coefficients and X+ is a pseudo-inverse matrix of the matrix X, such as a Moore-Penrose inverse. A benefit of this approach is that, from the structure of X, when N is sufficiently larger than L, certain received samples from $y_k$ may be discarded and the radar channel estimates still can be recovered by maintaining matrix X to be rank L.

Moreover, in many instances the radar channel coefficients vector $h_k$ is a sparse vector due to existence of a limited number of objects in the local environment with delay-Doppler profiles. As such, in some embodiments, the coefficient extraction component 220 can extract, or recover, the radar channel coefficients vector $h_k$ using any of a variety of sparse reconstruction techniques, such as the least absolute shrinkage and selection operator (LASSO) process, or basis pursuit denoising, in which the corresponding optimizations involve solving, respectively:

$$\min h_k \|h_k\|_1 \text{ s.t. } \|y_k - Xh_k\|_2^2 \le \delta \quad \text{(EQ. 5)}$$

and $$\min h_k \frac{1}{2} \|y_k - Xh_k\|_2^2 + \lambda \|h_k\|_1 \quad \text{(EQ. 6)}$$

With the radar channel coefficients (or estimates thereof) extracted, at block 318 the radar analysis component 222 utilizes the radar channel coefficients to estimate the radar profile of the local environment at time index k, and from this determine the range (relative distance) and/or relative speed/velocity of one or more objects represented in the radar profile for time index k. This can include one or more of a variety of well-known or proprietary distance-speed radar analysis processes that utilize radar channel coefficients. For example, since the transmitted subcarriers s[q,m] of the m-th sensing symbol are known, spectral division can be applied with regard to the radar channel coefficients (or estimates thereof), resulting in:

$$\vec{h}[q, m] = \frac{\vec{y}[q, m]}{s[q, m]} = \sum_{i=1}^{K} a_i e^{-j2\pi \frac{mp_i}{N_{sym}}} e^{-j2\pi \frac{c_i q}{N}} \quad \text{(EQ. 7)}$$

where $a_i = a_i' e^{-j2\pi f_c 2d_i/c}$, with $a_i'$ being a constant representing the phase and amplitude of the reflection by an i-th target, c representing the speed of light, $f_c$ representing the center carrier frequency, and $d_i$ is the initial distance (or range) of the i-th target. From EQ. 7, delay information can be extracted by applying an IFFT over the subcarriers q, such that:

$$h[k, m] = \sum_{i=1}^{K} a_i \delta(k - c_i) e^{-2j\pi \frac{mp_i}{N_{sym}}}. \quad \text{(EQ. 8)}$$

From EQ. 8, the Doppler information can be extracted by applying an FFT on the slow time m:

$$g[k, n] = \sum_{i=1}^{K} a_i \delta(k - c_i) \delta(n - p_i). \quad \text{(EQ. 9)}$$

The targets (that is, the objects in the local environments) are represented in EQ. 9 as impulses as positions $(k,n)=(c_i, p_i)$. Thus, by using the fact that $c_i=2d_i/(cTs)$ and that $p_i=2f_cN_{sym}T_{SRI}v_i/c$, each impulse position $(c_i, p_i)$ can determine the i-th target's distance and velocity tuple $(d_i, v_i)$. The resulting data regarding the range and/or speed of the identified objects at time index k is then output as range/velocity data 232 (FIG. 2), which may be employed by one or more processes of the JCAS device 102, such as for vehicular navigation or antenna beamforming, or transmitted by the JCAS device 102 to one or more other devices for their use or for compilation into a larger radar profile dataset. Concurrently, the time index k is incremented (k=k+1) and the radar sensing subprocess 304 is repeated for the next set of N bits in the input data stream.

Figure 6:
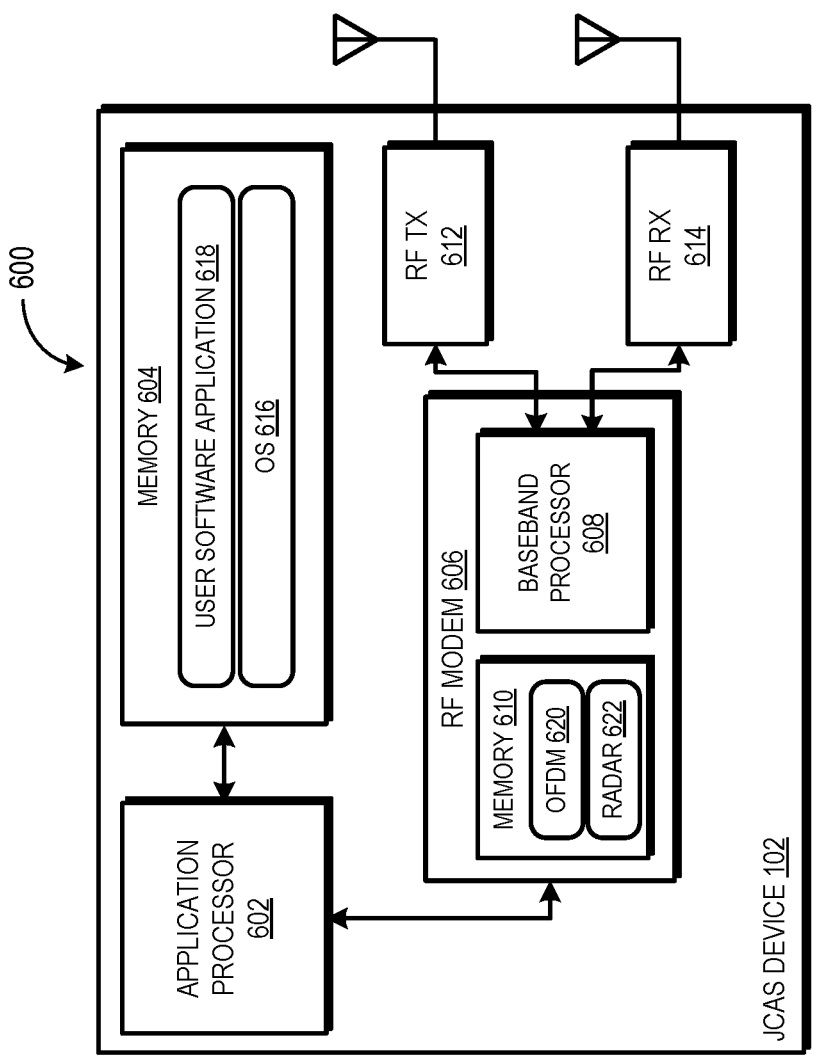
FIG. 6 is a diagram illustrating a hardware implementation of the JCAS device of FIGS. 1 and 2 in accordance with some embodiments.

FIG. 6 illustrates an example hardware implementation 600 of the JCAS device 102 in accordance with some embodiments. In the depicted example, the JCAS device 102 includes at least one application processor 602 (e.g., a central processing unit (CPU) or other general processor), a system memory 604, one or more RF modems 606, a transmitter (TX) RF front end 612 (one embodiment of the RF front end 212 and a receiver (RX) RF front end 614 (one embodiment of the RF front end 214). Although a single RF modem 606 is illustrated as supporting operation of both RF front ends 612 and 614, in other embodiments each RF front end may have a separate dedicated RF modem 606. The RF modem 606 includes a baseband processor 608 and a memory 610, which can include, for example, a Flash memory, non-volatile random-access memory (NVRAM) or other non-volatile memory, or static RAM (SRAM) or dynamic RAM (DRAM) or other volatile memory, or a combination thereof. Further, it will be appreciated that the JCAS device 102 can include a number of additional components omitted from FIG. 6 for ease of illustration including, for example, one or more displays, one or more touchscreens, keypads, mice, touchpads, microphones, speakers, and other user input/output devices, one or more sensors, batteries or other power sources, graphical processing units (GPUs) or other coprocessors, and the like.

The application processor 602 executes executable instructions from a software stack that includes an operating system (OS) 616 and one or more user software applications, such as user software application 618, and which further can include protocol stacks executed by the baseband processor 608 of the RF modem(s) 606. The OS 616, through manipulation of the application processor 602, manages the general operation of the various hardware components of the JCAS device 102 as well as supports the execution of the one or more user software applications, with the executable instructions representing the OS 616 and the user software application typically accessed from system memory 604 for execution by the application processor 602.

Further, the memory 610 of the RF modem 606 stores one or more sets of executable instructions that, when executed by the baseband processor 608, manipulate the baseband processor 608 to perform various operations in accordance with one or more communication protocols associated with the air interfaces provided by RF front ends 612 and 614. These operations can include various OFDM-related operations performed by execution of OFDM software 620, such as the operations described above with reference to the components 208, 210, and 216, and radar sensing operations performed by execution of radar sensing software 622, such as the operations of the coefficient extraction component 220 or the radar analysis component 222, in which case the memory 610 may serve as the memory 218 of the radar sensing path 206. In other embodiments, one or more operations of the radar sensing path 206 are performed by an application processor 602 (or a dedicated processor, such as a graphics processing unit, or GPU) executing software stored in the system memory 604. For example, the OFDM-related operations of the transmitter path 202 and the receiver path 204 may be performed at one or more RF modems 606, while the operations of the radar sensing path 206 are performed by the application processor 602 or associated co-processor. Still further, as noted above, in some embodiments one or more components of the paths 202, 204, or 206 may be implemented at least in part using hardcoded logic circuitry and/or programmable logic circuitry.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   transmitting, by a first device, a first radio frequency (RF) signal representing a first orthogonal frequency division multiplexing (OFDM) symbol at first time index;
   transmitting, by the first device, a second RF signal representing a second OFDM symbol at second time index, wherein the first RF signal and the second RF signal each have a cyclic prefix of a length shorter than a channel length for radar sensing by the first device in a local environment;
   receiving, at the first device, a third RF signal, the third RF signal representing a scattered representation of the second RF signal by one or more objects in the local environment of the first device; and
   determining a set of radar channel coefficients representing the local environment of the first device based on at least the third RF signal, the first OFDM symbol, and the second OFDM symbol, wherein determining the set of radar channel coefficients includes:
     determining a compensation matrix from at least the first OFDM symbol and the second OFDM symbol; and
     compensating for intersymbol interference (ISI) present in the third RF signal using the compensation matrix.

2. The method of claim 1, wherein each of the first RF signal and second RF signal represents corresponding communication data for receipt by a second device.

3. The method of claim 1, wherein the compensation matrix is represented in an expression:

$$y_k = Xh_k + w_k,$$

where X represents the compensation matrix composed of OFDM symbol samples from at least the first and second OFDM symbols, $h_k$ represents a vector of the radar channel coefficients for the second time index, $w_k$ represents a noise vector, and $y_k$ represents a vector of received OFDM symbol samples extracted from the third RF signal.

4. The method of claim 3, wherein the compensation matrix is represented as:

$$X_k = \begin{bmatrix} x_k[0] & x_k[N-1] & \ldots & x_k[N-P] & x_{k-1}[N-1] & x_{k-1}[N-2] & \ldots & x_{k-1}[P+1] \\ x_k[1] & x_k[0] & \ldots & x_k[N-P+1] & x_k[N-P] & x_{k-1}[N-1] & \ldots & x_{k-1}[P+2] \\ x_k[2] & x_k[1] & \ldots & x_k[N-P+2] & x_k[N-P+1] & \vdots & \ldots & x_{k-1}[P+3] \\ \vdots & \vdots & \ldots & \vdots & \vdots & \vdots & \ldots & \vdots \\ \vdots & \vdots & \ldots & \vdots & \vdots & \vdots & \ldots & x_{k-1}[N-1] \\ \vdots & \vdots & \ldots & \vdots & \vdots & \vdots & \ldots & x_k[N-P] \\ \vdots & \vdots & \ldots & \vdots & \vdots & \vdots & \ldots & \vdots \\ \vdots & \vdots & \ldots & x_k[N-1] & x_k[N-2] & \vdots & \ldots & \vdots \\ \vdots & \vdots & \ldots & x_k[0] & x_k[N-1] & \vdots & \ldots & \vdots \\ \vdots & \vdots & \ldots & x_k[1] & x_k[0] & \vdots & \ldots & \vdots \\ \vdots & \vdots & \ldots & \vdots & \vdots & \vdots & \ldots & \vdots \\ x_k[N-1] & x_k[N-2] & \ldots & x_k[N-P-1] & x_k[N-P-2] & x_k[N-P-3] & \ldots & x_k[0] \end{bmatrix}$$

where $X_k$ represents the compensation matrix, $X_{k-1}$ represents the first OFDM symbol, $X_k$ represents the second OFDM symbol, N is the length of the first and second OFDM symbols, and P is the length of the cyclic prefix.

5. The method of claim 3, wherein the vector $h_k$ is a sparse vector and determining the radar channel coefficients comprises determining the vector $h_k$ using a sparse reconstruction scheme.

6. The method of claim 1, wherein determining the radar channel coefficients comprises estimating the radar channel coefficients based on an expression:

$$\widehat{h_k} = X^+ y_k,$$

where $\widehat{h_k}$ represents the estimated radar channel coefficients and X+ is a pseudo-inverse matrix of the compensation matrix.

7. The method of claim 1, wherein the length of the cyclic prefix is set for a channel length of a communication environment between the first device and the second device.

8. The method of claim 1, further comprising:
   determining one or both of a relative distance or a relative velocity of each of one or more objects in the local environment based on the radar channel coefficients.

9. A device comprising:
   a memory;
   a first radio frequency (RF) front end;
   a second RF front end; and
   a modem coupled to the first RF front end and the second RF front end, the modem configured to:
     control the first RF front end to transmit a first RF signal representing a first orthogonal frequency division multiplexing (OFDM) symbol at a first time index and to transmit a second RF signal representing a second OFDM symbol at a second time index, wherein the first RF signal and the second RF signal each have a cyclic prefix of a length shorter than a channel length for radar sensing in a local environment;
     control the second RF front end to receive a third RF signal, the third RF signal representing a scattered representation of the second RF signal by one or more objects in a local environment of the device; and
     determine a set of radar channel coefficients representing the local environment of the device based on at least the third RF signal, the first OFDM symbol, and the second OFDM symbol, by:
  determining a compensation matrix from at least the first OFDM symbol and the second OFDM symbol; and
  compensating for intersymbol interference (ISI) present in the third RF signal using the compensation matrix.

10. The device of claim 9, wherein each of the first RF signal and second RF signal represents corresponding communication data for receipt by another device.

11. The device of claim 9, wherein the compensation matrix is represented in an expression:

$$y_k = Xh_k + w_k,$$

where X represents the compensation matrix composed of OFDM symbol samples from at least the first and second OFDM symbols, $h_k$ represents a vector of the radar channel coefficients for the second time index, $w_k$ represents a noise vector, and $y_k$ represents a vector of received OFDM symbol samples extracted from the third RF signal.

12. The device of claim 11, wherein the vector hk is a sparse vector and determining the radar channel coefficients comprises determining the vector hk using a sparse reconstruction scheme.

13. The device of claim 9, wherein determining the radar channel coefficients comprises estimating the radar channel coefficients based on an expression:

$$\widehat{h_k} = X^+ y_k,$$

where $\widehat{h_k}$ represents the estimated radar channel coefficients and X+ is a pseudo-inverse matrix of the compensation matrix.

14. The device of claim 9, wherein the length of the cyclic prefix is set for a channel length of a communication environment between the device and another device.

15. The device of claim 9, wherein the device is configured to determine one or both of a relative distance or a relative velocity of each of one or more objects in the local environment based on the radar channel coefficients.

16. A non-transitory computer-readable medium storing a set of instructions that are configured to manipulate at least one processor and one or more radio frequency (RF) front ends of a device to:
  determine a set of radar channel coefficients representing a local environment of the device based on at least a first OFDM symbol transmitted by the device as a first RF signal, a second OFDM symbol transmitted by the device as a second RF signal, wherein the first RF signal and the second RF signal each have a cyclic prefix of a length shorter than a channel length for radar sensing in a local environment and a third RF signal received by the device based on a reflection of the second RF signal by one or more objects in the local environment, wherein to determine the set of radar channel coefficients includes to:
    determine a compensation matrix from at least the first OFDM symbol and the second OFDM symbol; and
    compensate for intersymbol interference (ISI) present in the third RF signal using the compensation matrix.

17. The non-transitory computer-readable medium of claim 16, wherein the set of instructions are further configured to manipulate the at least one processor to:
  determine one or both of a relative distance or a relative velocity of each of one or more objects in the local environment based on the radar channel coefficients.

18. The non-transitory computer-readable medium of claim 16, wherein each of the first RF signal and second RF signal represents corresponding communication data for receipt by another device.

* * * * *